(12) United States Patent
Kim et al.

(10) Patent No.: US 12,094,194 B2
(45) Date of Patent: Sep. 17, 2024

(54) ELECTRONIC DEVICE FOR PERFORMING INFERENCE USING ARTIFICIAL INTELLIGENCE MODEL, BASED ON ENCRYPTED DATA, AND METHOD OF OPERATING THE SAME

(71) Applicant: SAMSUNG ELECTRONICS CO., LTD., Suwon-si (KR)

(72) Inventors: Jungkon Kim, Suwon-si (KR); Jinsu Kim, Suwon-si (KR); Junbum Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 17/573,835

(22) Filed: Jan. 12, 2022

(65) Prior Publication Data

US 2022/0230426 A1    Jul. 21, 2022

Related U.S. Application Data

(63) Continuation of application No. PCT/KR2021/015447, filed on Oct. 29, 2021.

(30) Foreign Application Priority Data

Jan. 20, 2021    (KR) .................. 10-2021-0008293

(51) Int. Cl.
*G06V 10/70*    (2022.01)
*G06F 17/15*    (2006.01)
(Continued)

(52) U.S. Cl.
CPC ............ *G06V 10/87* (2022.01); *G06F 17/156* (2013.01); *G06F 21/6227* (2013.01); *H04L 67/34* (2013.01)

(58) Field of Classification Search
CPC ....... G06V 10/87; G06F 17/156; G06F 17/17; G06F 21/6227; G06F 21/6245; H04L 67/34; H04L 67/12; G06N 3/04
See application file for complete search history.

(56) References Cited

U.S. PATENT DOCUMENTS 10,075,289 B2     9/2018  Laine et al.
2012/0278345 A1*  11/2012 Alexander ............ H04L 9/0656
                                                    707/756
(Continued)

FOREIGN PATENT DOCUMENTS

WO    2018/151552    8/2018

OTHER PUBLICATIONS

Search Report and Written Opinion issued Feb. 9, 2022 in counterpart International Patent Application No. PCT/KR2021/015447.
(Continued)

*Primary Examiner* — Aaron W Carter
*Assistant Examiner* — Kathleen M Broughton
(74) *Attorney, Agent, or Firm* — Nixon & Vanderhye P.C.

(57) ABSTRACT

Provided is a method for an electronic device to perform inference based on encrypted data received from an external device, using an artificial intelligence (AI) model, the method including: transforming the AI model to perform inference based on encrypted data, generating parameter information including information about at least one parameter for encrypting data to be input to the AI model, based on the transformed AI model, transmitting the parameter information to the external device, receiving, from the external device, data encrypted based on the parameter information, and obtaining an inference result output from the transformed AI model by inputting the encrypted data to the transformed AI model.

15 Claims, 6 Drawing Sheets

(51) Int. Cl.
  *G06F 21/62* (2013.01)
  *H04L 67/00* (2022.01)

(56) References Cited

U.S. PATENT DOCUMENTS

| | | | |
|---|---|---|---|
| 2016/0350648 A1* | 12/2016 | Gilad-Bachrach | G06N 3/08 |
| 2017/0317983 A1 | 11/2017 | Kompalli | |
| 2019/0044918 A1* | 2/2019 | Doshi | H04W 12/02 |
| 2020/0036510 A1* | 1/2020 | Gomez | H04L 9/008 |
| 2020/0104636 A1* | 4/2020 | Halevi | G06F 18/211 |
| 2021/0133577 A1* | 5/2021 | Srinivasan | G06N 20/00 |

OTHER PUBLICATIONS

Edward Chou et al, "Faster CryptoNets: Leveraging Sparsity for Real-World Encrypted Inference,"arXiv :1811.09953v1 [cs.CR], Nov. 25, 2018, pp. 1-15. [Search date: Jan. 3, 2022], Source: <https://arxiv.org/pdf/1811.09953.pdf>.

Xu, Runhua Xu et al, "CryptoNN: Training Neural Networks over Encrypted Data," 2019 IEEE 39th International Conference on Distributed Computing Systems (ICDCS), DOI: 10.1109/ICDCS. 2019.00121, Jul. 7, 2019, pp. 1199-1209. [Search date: Jan. 4, 2022]<https://ieeexplore.ieee.org/document/8885038>.

Brutzkus et al., "Low Latency Privacy Preserving Inference", Microsoft Research and Tel Aviv University, Jun. 6, 2019, pp. 1-18.

\* cited by examiner

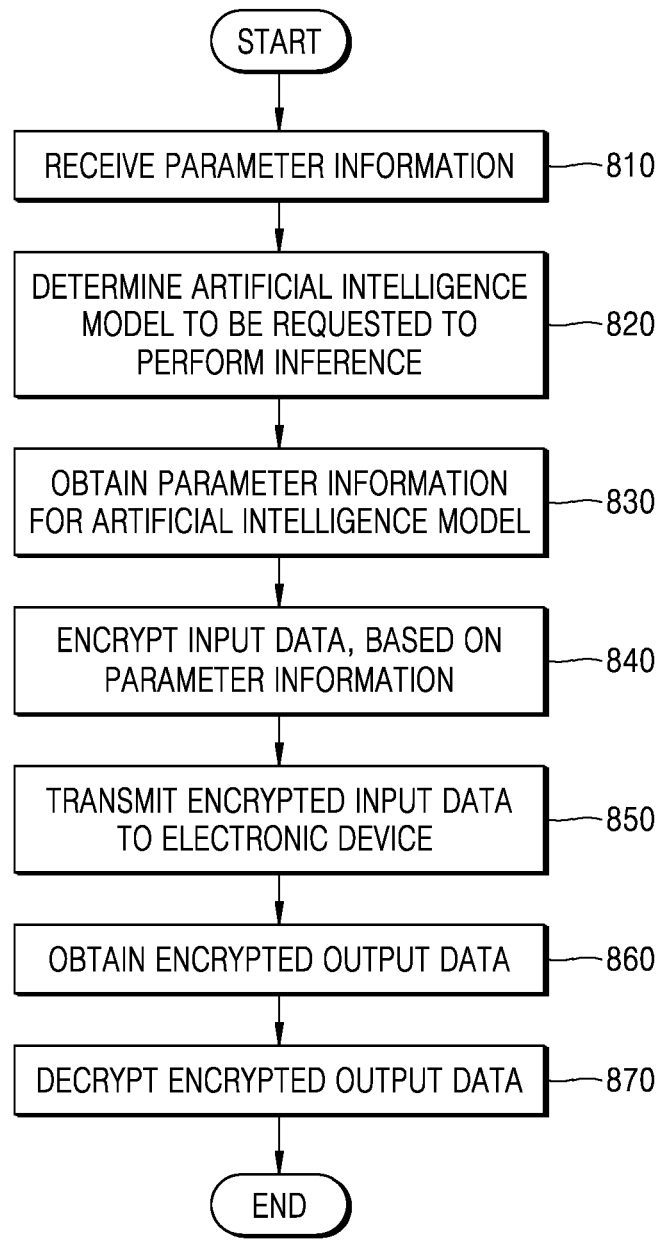

ELECTRONIC DEVICE FOR PERFORMING INFERENCE USING ARTIFICIAL INTELLIGENCE MODEL, BASED ON ENCRYPTED DATA, AND METHOD OF OPERATING THE SAME

CROSS-REFERENCE TO RELATED APPLICATIONS

This application is a continuation of International Application No. PCT/KR2021/015447 designating the United States, filed on Oct. 29, 2021, in the Korean Intellectual Property Receiving Office and claiming priority to Korean Patent Application No. 10-2021-0008293, filed on Jan. 20, 2021, in the Korean Intellectual Property Office, the disclosures of which are incorporated by reference herein in their entireties.

BACKGROUND

Field

The disclosure relates to an electronic device for performing inference using an artificial intelligence (AI) model, based on encrypted data received from an external device, and a method of operating the same.

Description of Related Art

Because a large amount of computation is required for inference using an artificial intelligence (AI) model, on behalf of an external device which has obtained input data, another device (e.g., a server) with higher performance may perform inference using the AI model, based on the input data. In this case, the input data may be transmitted from the external device which has obtained the input data, to the other device for performing inference using the AI model.

The input data of the AI model may include user data collected in various ways by the external device which is directly or indirectly used by a user, and thus various methods are used to protect the input data from being leaked.

SUMMARY

Embodiments of the disclosure provide an electronic device for performing inference using an artificial intelligence (AI) model, based on encrypted data received from an external device, and a method of operating the same.

Embodiments of the disclosure provide a computer-readable recording medium having recorded thereon a computer program for executing the above-described method.

Technical problems to be solved are not limited to the above-described problems, and other technical problems may exist.

According to an example embodiment of the disclosure, a method of operating an electronic device to perform inference based on encrypted data received from an external device using an artificial intelligence (AI) model includes: transforming the AI model to perform inference based on encrypted data, generating parameter information including information about at least one parameter for encrypting data to be input to the AI model, based on the transformed AI model, transmitting the parameter information to the external device, receiving, from the external device, data encrypted based on the parameter information, and obtaining an inference result output from the transformed AI model by inputting the encrypted data to the transformed AI model.

According to an example embodiment of the disclosure, an electronic device configured to perform inference based on encrypted data received from an external device, using an artificial intelligence (AI) model includes: a communicator including communication circuitry configured to transmit and/or receive data to and/or from the external device, a memory storing one or more instructions, and at least one processor configured to execute the one or more instructions stored in the memory to configure the processor to: transform the AI model to perform inference based on encrypted data, generate parameter information including information about at least one parameter for encrypting data to be input to the AI model, based on the transformed AI model, control the communicator to transmit the parameter information to the external device, control the communicator to receive, from the external device, data encrypted based on the parameter information, and obtain an inference result output from the transformed AI model by inputting the encrypted data to the transformed AI model.

According to an example embodiment of the disclosure, a non-transitory computer-readable recording medium has stored therein a computer program for executing the above-described operations.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8 is a flowchart illustrating an example method for requesting an electronic device to perform inference using an AI model, according to various embodiments.

DETAILED DESCRIPTION

Figure 1:
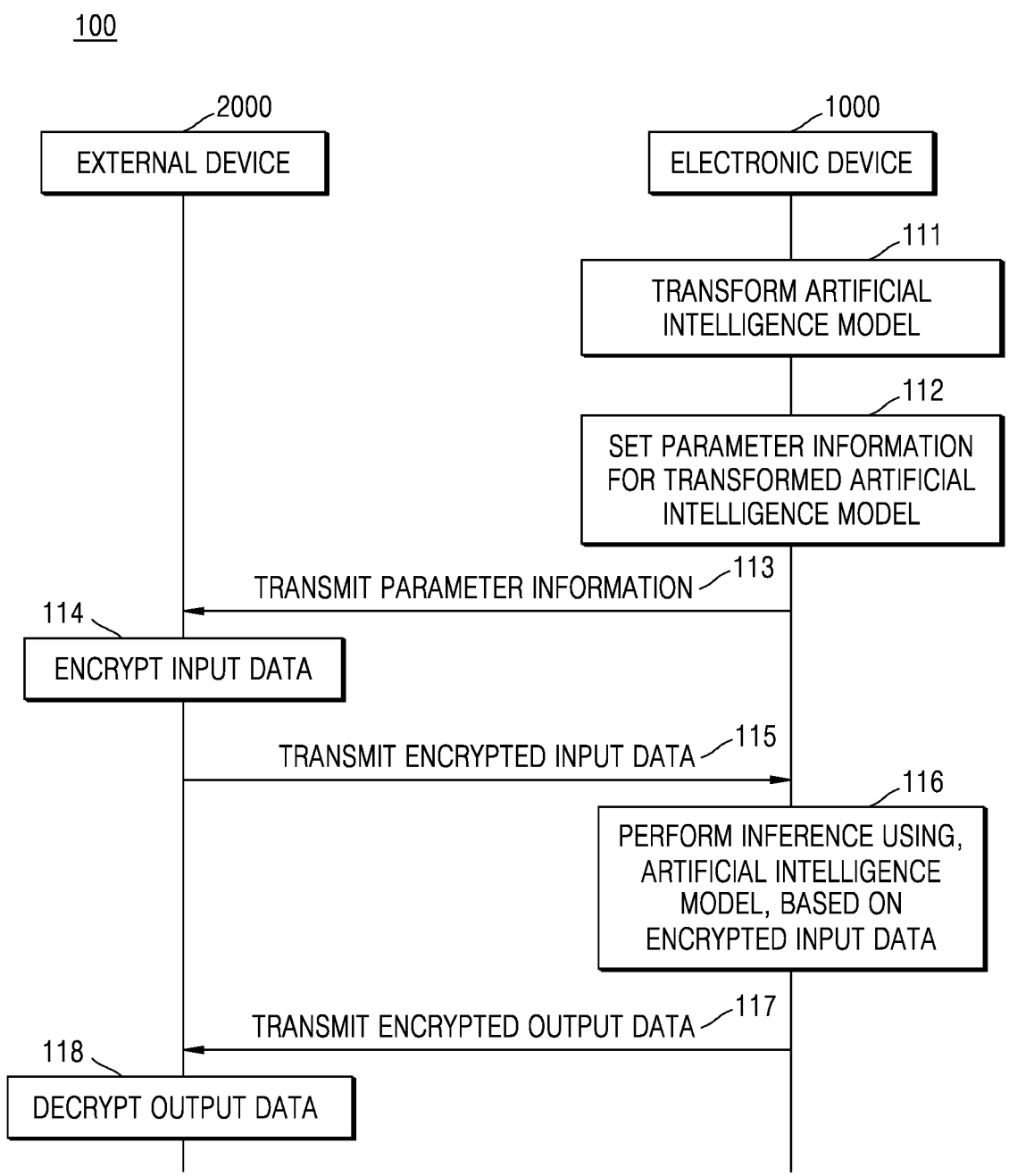
FIG. 1 is a signal flow diagram illustrating an example operation of a system for performing inference using an artificial intelligence (AI) model, based on encrypted data, according to various embodiments.

Throughout the disclosure, the expression "at least one of a, b or c" indicates only a, only b, only c, both a and b, both a and c, both b and c, all of a, b, and c, or variations thereof.

Hereinafter, the disclosure will be described in greater detail with reference to the attached drawings. The disclosure may, however, be embodied in many different forms and should not be construed as being limited to the various example embodiments of the disclosure set forth herein. In the drawings, parts not related to the disclosure may not be illustrated for clarity of explanation, and like reference numerals denote like elements throughout.

Throughout the disclosure, when an element is referred to as being "connected to" another element, the element can be "directly connected to" the other element or be "electrically connected to" the other element via an intervening element. The terms "comprises", "comprising", "includes" and/or "including", when used herein, specify the presence of stated elements, but do not preclude the presence or addition of one or more other elements, unless otherwise indicated herein.

Artificial intelligence (AI)-related functions according to the disclosure may be performed using a processor and a memory. The processor may include various processing circuitry including one or more processors. In this case, each of the one or more processors may include a general-purpose processor such as, for example, and without limitation, a central processing unit (CPU), an application processor (AP), or a digital signal processor (DSP), a dedicated graphics processor such as a graphics processing unit (GPU) or a vision processing unit (VPU), or a dedicated AI processor such as a neural processing unit (NPU). The one or more processors may control input data to be processed according to a predefined operation rule or an AI model stored in the memory. When the one or more processors are dedicated AI processors, the dedicated AI processors may be designed in a hardware structure specialized for processing a specific AI model.

The predefined operation rule or the AI model may be characterized by being made through training. Herein, being made through training may refer, for example, to a basic AI model being trained based on a learning algorithm using a plurality of pieces of training data and thus a predefined operation rule or an AI model configured to achieve a desired feature (or purpose) is made. The training may be performed directly by a device having an AI function according to the disclosure, or via a separate server and/or a system. Examples of the learning algorithm may include supervised learning, unsupervised learning, semi-supervised learning, and reinforcement learning, but are not limited thereto.

The AI model may include a plurality of neural network layers. Each of the plurality of neural network layers may have a plurality of weight values and performs a neural network operation through computation between an operation result of a previous layer and the plurality of weight values. The plurality of weight values of the plurality of neural network layers may be optimized based on a result of training the AI model. For example, the plurality of weight values may be updated to reduce or minimize a loss or cost value obtained by the AI model during the training process. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, or the like, but is not limited thereto.

Reference will now be made in greater detail to embodiments of the disclosure, examples of which are illustrated in the accompanying drawings.

FIG. 1 is a signal flow diagram illustrating an example operation of a system 100 for performing inference using an AI model, based on encrypted data, according to various embodiments.

Referring to FIG. 1, the system 100 according to an embodiment of the disclosure may include an external device 2000 and an electronic device 1000.

The external device 2000 may obtain data to be input to the AI model, and transmit the data to the electronic device 1000. The electronic device 1000 may infer output data using the AI model, based on the input data received from the external device 2000, and transmit the output data to the external device 2000. Inference using the AI model according to an embodiment of the disclosure may refer to an operation of obtaining output data by inputting input data to the AI model.

The external device 2000 according to an embodiment of the disclosure may request an inference result using the AI model from the electronic device 1000 by transmitting, to the electronic device 1000, the data to be input to the AI model. The electronic device 1000 according to an embodiment of the disclosure may perform inference using the AI model, based on the input data in response to the request of the external device 2000, and transmit, to the external device 2000, the inference result output from the AI model.

The external device 2000 according to an embodiment of the disclosure may include a device which does not include the AI model or has a lower performance for performing inference using the AI model compared to the electronic device 1000. Therefore, the external device 2000 may be a device capable of directly collecting various types of user data, requesting the electronic device 1000 to perform inference using the AI model based on the collected data, and providing, to a user, the inference result of the AI model received from the electronic device 1000.

For example, the external device 2000 may, for example, include a wearable device or any of various types of home appliances (e.g., a refrigerator, a washing machine, a television (TV), an air conditioner, or a robotic vacuum cleaner), etc. The external device 2000 may include a device directly usable by the user, e.g., a digital camera, a smartphone, a laptop computer, a tablet PC, an e-book reader, a digital broadcast receiver, a personal digital assistant (PDA), a portable multimedia player (PMP), a navigation system, an MP3 player, a vehicle, etc. Without being limited thereto, the external device 2000 may include various types of devices capable of collecting user data in various ways, and transmitting the user data to the electronic device 1000.

The electronic device 1000 according to an embodiment of the disclosure may include a device which does not directly collect the user data but includes the AI model and has a performance suitable for performing inference using the AI model. For example, the electronic device 1000 may be a device located far away from and not managed by the user, e.g., a server device with higher performance than home appliances or mobile devices used by the user. The electronic device 1000 may be a device which includes the AI model and has a performance suitable for performing inference using the AI model on behalf of the external device 2000, e.g., a smartphone, a laptop computer, or a desktop computer. Without being limited thereto, the electronic device 1000 may include various types of devices with a performance suitable for performing inference using the AI model.

The external device 2000 according to an embodiment of the disclosure may be directly used and managed by the user, and thus a risk of leakage of the user data collected by the external device 2000 may be low. However, when the external device 2000 transmits the data to be input to the AI model to the electronic device 1000 to request the electronic device 1000 to perform inference using the AI model, a risk of leakage of the user data during transmission may exist. In addition, when the electronic device 1000 is an external server device, because the electronic device 1000 is used and managed not by the user but by a server manager, a risk that the data received from the external device 2000 is leaked by the server or the server manager may exist.

However, the user data collected by the external device 2000 according to an embodiment of the disclosure and usable as the input data of the AI model may include critical data of the user, e.g., personal data or financial data. Therefore, leakage of the user data which may occur when the external device 2000 requests the electronic device 1000 to perform inference using the AI model may cause a significant damage to the user.

Accordingly, in an embodiment of the disclosure, when the external device 2000 requests the electronic device 1000 to perform inference using the AI model, in order to protect the input data, the external device 2000 may encrypt the input data and then transmit the encrypted input data to the electronic device 1000. In this case, the input data may be encrypted with homomorphic encryption and then transmitted to the electronic device 1000.

Unlike existing encryption technologies, the homomorphic encryption technology according to an embodiment of the disclosure includes a technology capable of performing a process such as computation or analysis on encrypted data without decrypting the data. Based on the homomorphic encryption technology according to an embodiment of the disclosure, data may be encrypted or encrypted data may be processed in various ways in such a manner that a result of processing encrypted data equals a result of processing non-encrypted data.

Using the input data encrypted with homomorphic encryption according to an embodiment of the disclosure, the electronic device 1000 may perform inference using the AI model, based on the input data in an encrypted state without decrypting the input data. In addition, the result of performing inference using the AI model may also be obtained in an encrypted state.

In an embodiment of the disclosure, the system 100 for performing inference using the AI model, based on the encrypted input data, may perform inference using the AI model of the electronic device 1000 and the external device 2000 through operations 111, 112, 113, 114, 115, 116, 117 and 118.

In operation 111, the electronic device 1000 may transform the AI model to be suitable for processing encrypted input data.

The AI model according to an embodiment of the disclosure may include a model trained based on non-encrypted data, and thus may not be suitable for processing the encrypted input data. For example, because the encrypted input data is added with information for encryption and thus has a larger data size than input data before being encrypted, an amount of computation required for the AI model to process the encrypted input data may be increased compared to that required to process non-encrypted input data. In addition, because the encrypted input data includes a data structure different from that of the input data before being encrypted, operations or functions included in the AI model may include an operation or function incapable of processing the encrypted input data.

Therefore, the electronic device 1000 according to an embodiment of the disclosure may transform the AI model to perform inference with a smaller amount of computation, based on the encrypted input data.

Transformation of the AI model according to an embodiment of the disclosure may be performed by transforming a function incapable of processing the encrypted data (e.g., a non-polynomial function, a rectified linear unit (ReLU) function, or a sigmoid function) from among the functions included in the AI model, to a function capable of processing the encrypted data (e.g., a polynomial function).

For example, an AI model capable of performing computation based on a non-polynomial function may not easily process the encrypted input data due to the characteristics of the encrypted input data. Therefore, the electronic device 1000 according to an embodiment of the disclosure may transform the AI model by transforming a non-polynomial function included in the AI model, to a polynomial function approximated to the non-polynomial function, as illustrated by way of example in Equation 1.

$$\text{logistic function } f(x) = \qquad\qquad\qquad\qquad [\text{Equation 1}]$$
$$(1 + \exp(-x))^{-1} \rightarrow f(x) = \frac{1}{2} + \frac{1}{4}x - \frac{1}{48}x^3 +$$
$$\frac{1}{480}x^5 - \frac{17}{80640}x^7 + \frac{31}{1451520}x^9 + O(x^{11})$$

In an embodiment of the disclosure, the transformed AI model includes a new function approximated to an original function, and thus may output data not the same as but similar to the output data of the AI model before being transformed. However, the transformed AI model may process the encrypted input data. Although the output of the AI model is slightly distorted due to transformation, the AI model may be transformed to perform inference based on the encrypted input data.

As another example, the electronic device 1000 may transform the AI model by transforming a type of operation requiring a large amount of computation to process the encrypted input data (e.g., multiplication) from among the operations included in the AI model, to another type of operation requiring a smaller amount of computation (e.g., addition or rotation). For example, multiplication may require a significantly large amount of computation to process the encrypted input data compared to other operations. Therefore, the electronic device 1000 may transform the AI model by transforming multiplication to another operation requiring a smaller amount of computation to reduce the number of multiplications performed by the AI model.

According to an embodiment of the disclosure, in addition to the functions or operations, the AI model may be transformed by transforming a structure of data processed by the AI model. According to an embodiment of the disclosure, the structure of data input to or output from each layer of the AI model may be reconstructed based on the encrypted input data. According to an embodiment of the disclosure, the AI model may be transformed to process the encrypted input data based on the reconstructed data structure.

The encrypted input data may include data having a size and structure different from those of non-encrypted input data. Therefore, the structure of data input to or output from each layer of the AI model may be reconstructed in such a manner that the encrypted input data may be processed by the AI model. In an embodiment of the disclosure, an array structure of encrypted data at an input or output end of each of layers of the AI model may be reconstructed in such a manner that the encrypted data included in the input data may be sequentially processed by the layers with a smaller amount of computation.

According to an embodiment of the disclosure, instead of transforming a part of the AI model (e.g., a layer, a function, or an operator), a part of operation of the AI model may be performed by the external device 2000 which collects the input data. For example, according to multi-party computation (MPC) technology, a part of operation of the AI model may be processed by the external device 2000.

In this case, operation of a segmented model including a part of the AI model (e.g., a layer, a function, or an operator) may be performed by the external device 2000.

In an embodiment of the disclosure, the external device 2000 may decrypt encrypted data and perform a part of operation of the segmented model of the AI model on the decrypted data. For example, when encrypted data to be input to the segmented model is obtained while sequentially processing the operations included in the AI model, the electronic device 1000 may transmit the encrypted data to the external device 2000 together with a request to process the segmented model. The external device 2000 may decrypt the encrypted data, and then process the segmented model in a distributed manner, based on the decrypted data. The external device 2000 may decrypt the encrypted data using a private key used to encrypt the input data of the AI model.

In an embodiment of the disclosure, data including the distributed process result of the external device 2000 may be re-encrypted by the external device 2000 and then transmitted to the electronic device 1000. The electronic device 1000 may sequentially process the remaining operations which have not yet been processed by the AI model, based on the encrypted data received from the external device 2000.

In operation 112, the electronic device 1000 may set parameter information for the AI model transformed in operation 111. In an embodiment of the disclosure, the parameter information may include at least one parameter for the external device 2000 to encrypt input data.

In an embodiment of the disclosure, the electronic device 1000 may set the parameter information (e.g., a parameter for homomorphic encryption) in such a manner that the input data may be encrypted based on the AI model for processing the input data, and provide the set parameter information to the external device 2000.

In an embodiment of the disclosure, the electronic device 1000 may set the parameter information for encryption with respect to at least one AI model for which an inference request is receivable from the external device 2000. When the parameter information is set, the electronic device 1000 may transmit the parameter information to at least one external device 2000 capable of requesting inference using the at least one AI model in operation 113.

In an embodiment of the disclosure, the parameter information may include at least one parameter usable to encrypt the input data, e.g., a size of ciphertext, a length of an error included in the ciphertext, a size of plaintext included in the ciphertext, etc. The ciphertext according to an embodiment of the disclosure may include the plaintext, the error, a masking region, etc. to represent the encrypted data. Without being limited thereto, the parameter information may include information about various parameters usable to encrypt the input data.

The parameter information may be set in such a manner that input data may be encrypted based on the characteristics of the AI model. For example, because the characteristics of the AI model are changed when the AI model is transformed, the parameter information may be set based on the transformed AI model.

In an embodiment of the disclosure, the AI model may repeatedly perform an operation on the encrypted input data, and thus the error included in the ciphertext of the encrypted data may be gradually increased. Because the ciphertext includes the plaintext and the error together, in order to prevent and/or reduce the plaintext (e.g., an original value) included in the ciphertext from being distorted by the error, the parameter information may be set to reduce the size of the error in proportion to the number of operations performed on the encrypted input data. Therefore, the parameter information may be set based on the number of operations performed by the AI model on the encrypted input data, in such a manner that encrypted data including an error with an appropriate size may be generated by the external device 2000.

In an embodiment of the disclosure, the parameter information may be set differently depending on a type of the data processed by the AI model. Because a data type of the input data of the AI model may vary depending on the type of the data processed by the AI model, the parameter information may be set in such a manner that the input data may be encrypted based on the data type. According to an embodiment of the disclosure, a type of the parameter included in the parameter information may vary depending on the type of the data processed by the AI model.

For example, when the type of the data processed by the AI model is an integer, the parameter information may be set according to, for example, and without limitation, to the Brakerski/Fan-Vercauteren (BFV) scheme, the Brakerski-Gentry-Vaikuntanathan (BGV) scheme, or the like. When the type of the data processed by the AI model is a floating point type (e.g., a complex number or a real number), the parameter information may be set, for example, and without limitation, according to the Cheon-Kim-Kim-Song (CKKS) scheme, the homomorphic encryption for arithmetic of approximate numbers (HEAAN) scheme, or the like.

Without being limited thereto, the parameter information may be set based on various characteristics of the AI model for processing the encrypted input data.

In operation 113, the electronic device 1000 may transmit, to the external device 2000, the parameter information set in operation 112. In an embodiment of the disclosure, the same parameter information may be transmitted to at least one external device 2000 capable of requesting the electronic device 1000 to perform inference using the AI model.

In operation 114, the external device 2000 may encrypt input data based on the received parameter information. In an embodiment of the disclosure, the input data is data to be input to the AI model and may include various types of data collected by the external device 2000.

In an embodiment of the disclosure, operation 114 may be performed when an operation for providing a service to a user is started based on user data collected by the external device 2000. Without being limited thereto, for various purposes, operation 114 may be performed by the external device 2000 to request inference using the AI model.

In operation 115, after being encrypted based on the parameter information, the input data may be transmitted to the electronic device 1000.

In an embodiment of the disclosure, the external device 2000 may generate a public key and a private key to encrypt the input data in operation 114, and additionally transmit the public key to the electronic device 1000 in operation 115.

The private key according to an embodiment of the disclosure may include a key for the external device 2000 to decrypt encrypted output data. The public key may be used by the electronic device 1000 to obtain encrypted output data by processing the AI model based on the encrypted input data. For example, the public key may be input to the AI model together with the encrypted input data, the AI model may perform inference, and thus the encrypted output data may be obtained by the electronic device 1000.

Without being limited thereto, the external device 2000 may further transmit, to the electronic device 1000, various types of data usable by the electronic device 1000 to process the encrypted input data.

In operation 116, the electronic device 1000 may perform inference using the AI model, based on the received encrypted input data. In an embodiment of the disclosure, the AI model for performing inference in operation 116 may be the AI model transformed in operation 111. In an embodiment of the disclosure, because the AI model is previously transformed to perform inference based on the encrypted input data, the input data configured as ciphertext may be processed by the AI model.

In operation 117, the electronic device 1000 may transmit, to the external device 2000, encrypted output data including the result of performing inference using the AI model based on the input data. The output data according to an embodiment of the disclosure may be obtained in an encrypted state by the AI model based on the encrypted input data.

In operation 118, the external device 2000 may decrypt the encrypted output data. The output data according to an embodiment of the disclosure may be decrypted based on the private key generated by the external device 2000 to encrypt the input data in operation 114.

Without being limited thereto, the output data may be decrypted by the external device 2000 in various ways. The external device 2000 according to an embodiment of the disclosure may provide, to the user based on the decrypted output data, various types of data related to the result of performing inference using the AI model.

Figure 2:
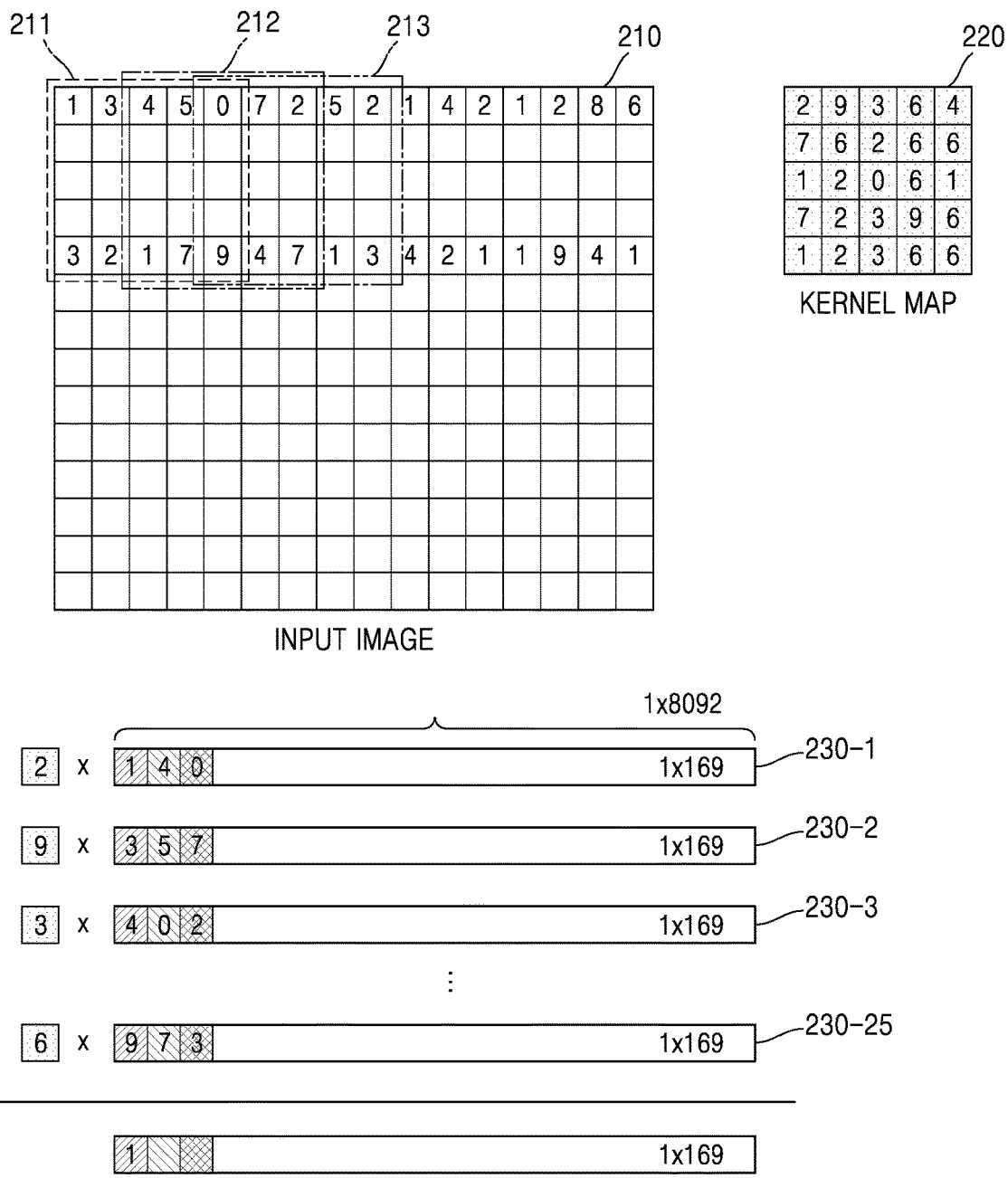
FIG. 2 is a diagram illustrating an example of changing a data structure, according to various embodiments.

FIG. 2 is a diagram illustrating an example of changing a data structure, according to various embodiments.

Referring to FIG. 2, a data structure of encrypted input data input to or output from each layer of an AI model according to an embodiment of the disclosure may be determined in such a manner that the encrypted input data may be processed by the AI model. In addition, parameter information may be set in such a manner that input data may be encrypted based on the determined data structure.

For example, the data structure of the encrypted input data may be previously determined to reduce the number of multiplications performed based on convolution included in the AI model. The input data may be encrypted by the external device 2000 based on the previously determined data structure, and the encrypted input data may be input to the AI model.

When the AI model according to an embodiment of the disclosure includes a layer for performing convolution on an input image 210, the data structure of the encrypted input data may be determined in such a manner that convolution of the AI model may be performed on encrypted data of the input image 210.

In an embodiment of the disclosure, because the encrypted data has a larger size and a more complex structure compared to non-encrypted data, an amount of computation for multiplication performed on the encrypted input data input to the AI model may be significantly larger than that for addition. Therefore, the encrypted input data may be generated to reduce the number of multiplications performed on the encrypted input data when the electronic device 1000 performs inference using the AI model.

However, in convolution according to an embodiment of the disclosure, multiplication on each pixel value of the input image 210 may be repeatedly performed based on a kernel map 220. For example, multiplication based on the kernel map 220 may be performed 25 times on pixels included in a first pixel group 211, and equally performed 25 times on pixels included in each of a second pixel group 212 and a third pixel group 213.

In an embodiment of the disclosure, when the encrypted data of the input image 210 includes ciphertexts respectively corresponding to pixel values included in the input image 210, multiplication based on convolution may be repeatedly performed on the ciphertexts. Therefore, because multiplication on ciphertext is repeatedly performed a number of times corresponding to the number of multiplications performed on the input image 210 based on the kernel map 220, the amount of computation may be significantly increased.

In an embodiment of the disclosure, to reduce the number of multiplications, a single ciphertext may be generated for a plurality of pixel values of the input image 210 to which the same value of the kernel map 220 is applied. For example, a single ciphertext 230-1 may be generated for a plurality of pixel values 1, 4, and 0 of pixels located in the first column and the first row of each of the first, second, and third pixel groups 211, 212, and 213. On the ciphertext 230-1, multiplication based on a value (e.g., 2) in the first column and the first row of the kernel map 220 may be performed once. Likewise, a ciphertext 230-2 may be generated for a plurality of pixel values 3, 5, and 7 of pixels located in the second column and the first row of each of the first, second, and third pixel groups 211, 212, and 213, and multiplication based on a value (e.g., 9) in the second column and the first row of the kernel map 220 may be performed once.

According to an embodiment of the disclosure, because each ciphertext 230-1 includes an encrypted value of a plurality of pixel values to which the same value of the kernel map 220 is applied, a number of ciphertexts corresponding to the number of pixels included in the kernel map 220 may be generated. For example, when the kernel map 220 has a size of 5×5, 25 ciphertexts (230-1 to 230-25) respectively corresponding to the pixels of the kernel map 220 may be generated.

Therefore, according to an embodiment of the disclosure, because multiplication on each ciphertext may be performed a number of times corresponding to the number of pixel values included in the kernel map 220, the number of multiplications may be reduced.

According to an embodiment of the disclosure, for other operations performed after convolution (e.g., a square function and a dense layer), a structure of encrypted data input to or output from each operation may also be determined. Therefore, the AI model according to an embodiment of the disclosure may be transformed to be processed based on the data structure determined for each operation.

Figure 3:
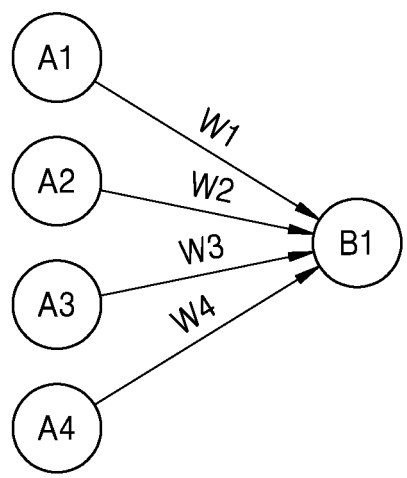
FIG. 3 is a diagram illustrating an example of transforming an operation included in an AI model, according to various embodiments.

FIG. 3 is a diagram illustrating an example of transforming an operation included in an AI model, according to various embodiments.

Referring to FIG. 3, the AI model according to an embodiment of the disclosure may include an operation of obtaining a weighted sum B1 by applying weights W1, W2, W3, and W4 respectively to A1, A2, A3, and A4. The operation of obtaining B1 may be represented by Equation 2.

$$HE(B1)=HE(A1)*HE(W1)+HE(A2)*HE(W2)+HE(A3)*HE(W3)+HE(A4)*HE(W4) \quad \text{[Equation 2]}$$

In Equation 2, HE in HE(A1) indicates that an operation is performed on encrypted (e.g., homomorphically encrypted) ciphertext of A1. Referring to Equation 2, multiplication may be performed on ciphertext four times.

However, because multiplication on ciphertext requires a significantly large amount of computation, according to an embodiment of the disclosure, the AI model may be transformed to perform other operations having small amounts of computation instead of multiplication. For example, a plurality of multiplications may be transformed to a combination of additions and rotations.

Equation 3 shows an example in which multiplication of Equation 2 is transformed.

$$c = HE(A1,A2,A3,A4) * HE(W1,W2,W3,W4) = HE(A1W1, A2W2, A3W3, A4W4)$$

$$c' = HE(A3W3, A4W4, A1W1, A2W2)$$

$$c+c' = HE(A1W1+A3W3, A2W2+A4W4, A3W3+A1W1, A4W4+A2W2)$$

$$(c+c')' = HE(A2W2+A4W4, A1W1+A3W3, A4W4+A2W2, A3W3+A1W1)$$

$$c+c'+(c+c')' = HE(A1W1+A2W2+A3W3+A4W4, \ldots ) = HE(B1, B1, B1, B1) \quad \text{[Equation 3]}$$

In Equation 3, ciphertexts of A1 W1, A2W2, A3W3, and A4W4 may be obtained by performing multiplication on the ciphertexts of A1, A2, A3, and A4 and the ciphertexts of W1, W2, W3, and W4. In this case, like the ciphertexts 230-1 to 230-25 of FIG. 2, each of the ciphertexts of A1, A2, A3, and A4 may be obtained by arranging encrypted values of A1, A2, A3, or A4 in a single ciphertext.

In addition, c' indicates than rotation is performed on c, and may be obtained by switching locations of values included in a ciphertext c based on rotation. Likewise, (c+c')' may also be obtained by switching locations of values included in a ciphertext c+c' based on rotation.

Referring to Equation 3, a ciphertext of B1 may be obtained based on c+c'+(c+c')'. Therefore, unlike Equation 2 by which four multiplications are performed on ciphertext, according to Equation 3, one multiplication, and additions and rotations having smaller amounts of computation compared to multiplication are performed on ciphertext. Therefore, according to an embodiment of the disclosure, a plurality of multiplications may be transformed to at least one operation having a smaller amount of computation, based on a combination of additions and rotations.

Figure 4:
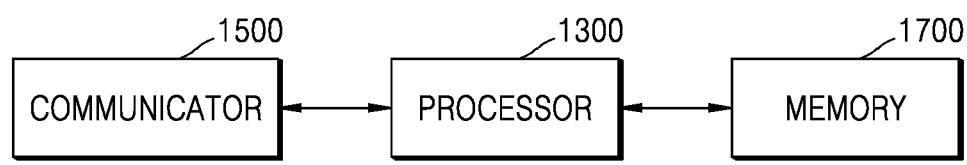
FIG. 4 is a block diagram illustrating an example configuration of an electronic device according to various embodiments.

FIG. 4 is a block diagram illustrating an example configuration of the electronic device 1000 according to various embodiments.

Referring to FIG. 4, the electronic device 1000 may include a processor (e.g., including processing circuitry) 1300, a communicator (e.g., including communication circuitry) 1500, and a memory 1700. However, not all elements illustrated in FIG. 4 are essential elements of the electronic device 1000. The electronic device 1000 be implemented with more elements than the shown elements of FIG. 4 or may be implemented with fewer elements than the shown elements of FIG. 4.

The electronic device 1000 may include at least one processor 1300 including various processing circuitry. For example, the electronic device 1000 may include various types of processors, each including various processing circuitry, e.g., a central processing unit (CPU), a graphics processing unit (GPU), a neural processing unit (NPU), or the like, but is not limited thereto.

The processor 1300 may be configured to process commands of a computer program by performing basic arithmetic, logic, and input/output operations. The commands may be provided from the memory 1700 to the processor 1300, or be received through the communicator 1500 and provided to the processor 1300. For example, the processor 1300 may be configured to execute commands based on program code stored in a recording device such as memory.

The processor 1300 according to an embodiment of the disclosure may include various processing circuitry and perform inference using an AI model, based on encrypted data received from an external device. The processor 1300 according to an embodiment of the disclosure may transform the AI model to perform inference based on the encrypted data.

For example, the processor 1300 may transform an operation or function incapable of processing the encrypted data from among operations or functions included in the AI model, to another operation or function capable of processing the encrypted data. The processor 1300 may transform an operator requiring a large amount of computation to process the encrypted data from among operators included in the AI model, to another operator requiring a small amount of computation. The processor 1300 may transform the AI model by transforming a structure of data processed by each layer of the AI model, based on the encrypted data. Without being limited thereto, the processor 1300 may transform the AI model in various ways in such a manner that the AI model trained based on non-encrypted data may perform inference based on the encrypted data.

After the AI model is transformed, the processor 1300 according to an embodiment of the disclosure may generate parameter information including information about at least one parameter for encrypting data to be input to the AI model, based on the transformed AI model. The parameter according to an embodiment of the disclosure may be set in such a manner that encrypted data including ciphertext and an error with appropriate lengths may be generated based on a type and the number of operators included in the AI model. For example, the parameter information may be generated to increase the length of the ciphertext or reduce the size of the error in proportion to the number of multiplications performed by the AI model on the ciphertext of the input data.

The parameter information according to an embodiment of the disclosure may be transmitted to at least one external device 2000, and the external device 2000 may transmit the data encrypted based on the parameter information, to the electronic device 1000 as input data of the AI model.

The processor 1300 according to an embodiment of the disclosure may perform inference using the AI model, based on the encrypted data received from the external device 2000. The processor 1300 may perform inference based on the encrypted data, using the previously transformed AI model. Therefore, according to an embodiment of the disclosure, an amount of computation may be reduced compared to a case in which inference based on the encrypted data is performed using a non-transformed AI model.

The communicator 1500 may include one or more elements including various communication circuitry for enabling the electronic device 1000 to communicate with the external device 2000. For example, the communicator 1500 may include various communication circuitry including, for example, a short-range wireless communicator (not shown), a mobile communicator (not shown), and a broadcast receiver (not shown).

The short-range wireless communicator may include a Bluetooth communicator, a Bluetooth low energy (BLE) communicator, a near-field communication (NFC) communicator, a wireless local area network (WLAN) (or Wi-Fi) communicator, a Zigbee communicator, an infrared data association (IrDA) communicator, a Wi-Fi direct (WFD)

communicator, a ultra-wideband (UWB) communicator, or an Ant+ communicator, but is not limited thereto.

The mobile communicator transmits and/or receives a radio signal to or from at least one of a base station, an external terminal, or a server in a mobile communication network. Herein, the radio signal may include various types of data based on transmission or reception of a voice call signal, a video call signal, or a text/multimedia message.

The broadcast receiver receives broadcast signals and/or broadcast information through broadcast channels from outside. The broadcast channels may include satellite channels and terrestrial channels. Depending on implementation, the electronic device 1000 may not include the broadcast receiver 1530.

The communicator 1500 according to an embodiment of the disclosure may transmit and/or receive, to or from the external device 2000, data required for the AI model to perform inference.

The communicator 1500 according to an embodiment of the disclosure may transmit, to the external device 2000, the parameter information set based on the transformed AI model. The communicator 1500 may receive the encrypted input data from the external device 2000. The electronic device 1000 according to an embodiment of the disclosure may perform inference based on the encrypted input data using the transformed AI model, and transmit, through the communicator 1500 to the external device 2000, data output as a result of performing inference.

Because the data output as the result of performing inference according to an embodiment of the disclosure is in an encrypted stated, a risk of leakage of the output data while being transmitted to the external device 2000 or by the electronic device 1000 may be reduced.

Without being limited thereto, the communicator 1500 may transmit or receive, to or from the external device 2000 or other external devices (not shown), various types of data required for the electronic device 1000 to perform inference using the AI model.

The memory 1700 may store programs for processing and control operations of the processor 1300, and may also store data input to or to be output from the electronic device 1000.

The memory 1700 according to an embodiment of the disclosure may store one or more instructions, and the above-described at least one processor 1300 of the electronic device 1000 may execute the one or more instructions stored in the memory 1700 to perform inference using the AI model according to an embodiment of the disclosure.

The memory 1700 may include at least one type of storage medium from among flash memory, a hard disk, a multimedia card micro, a memory card (e.g., a secure digital (SD) or extreme digital (XD) memory card), random access memory (RAM), static RAM (SRAM), read-only memory (ROM), electrically erasable programmable ROM (EEPROM), programmable ROM (PROM), magnetic memory, a magnetic disc, and an optical disc.

The memory 1700 according to an embodiment of the disclosure may store the AI model capable of performing inference based on the encrypted data. When the AI model according to an embodiment of the disclosure is transformed to perform inference based on the encrypted data, the memory 1700 may store the transformed AI model.

Figure 5:
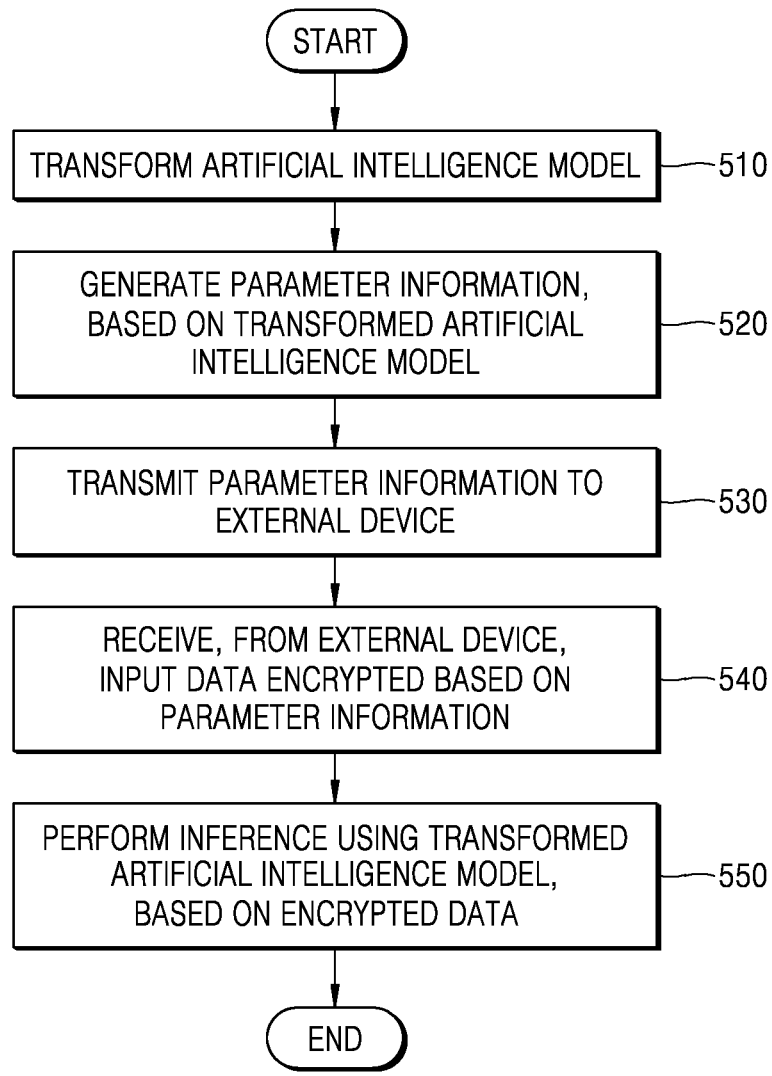
FIG. 5 is a flowchart illustrating an example method for performing inference using an AI model, according to various embodiments.

FIG. 5 is a flowchart illustrating an example method for the electronic device 1000 to perform inference using an AI model, according to various embodiments.

Referring to FIG. 5, in operation 510, the electronic device 1000 may transform the AI model. In an embodiment of the disclosure, the AI model may be transformed to be suitable for processing encrypted data. For example, a function incapable of processing the encrypted data from among functions included in the AI model may be transformed to another function capable of processing the encrypted data. At least one of operators included in the AI model may be transformed to another operator requiring a smaller amount of computation to process the encrypted data. A structure of data input to or output from each layer included in the AI model may be transformed to reduce an amount of computation required to process the encrypted data. Without being limited thereto, the AI model may be transformed in various ways to be suitable for processing the encrypted data.

In operation 520, the electronic device 1000 may generate parameter information, based on the AI model transformed in operation 510. Because the AI model according to an embodiment of the disclosure is transformed to be suitable for processing the encrypted data in operation 510, the AI model may include an operator different from those included in the AI model before being transformed, or the number of operators included in the AI model may vary.

According to an embodiment of the disclosure, because the encrypted data may be processed by the transformed AI model, the parameter information may be generated in such a manner that input data may be encrypted based on the transformed AI model.

The AI model according to an embodiment of the disclosure may be continuously updated based on various types of data collected by the electronic device 1000. Because operators or functions included in the AI model may be changed when the AI model is updated, the parameter information may be reset for the updated AI model. For example, the electronic device 1000 may transform the updated AI model to perform inference on the encrypted data, and then reset the parameter information for the transformed AI model. According to an embodiment of the disclosure, whenever the parameter information is reset, the reset parameter information may be transmitted to the external device 2000.

In operation 530, the electronic device 1000 may transmit the parameter information to at least one external device 2000. In an embodiment of the disclosure, the electronic device 1000 may transmit the parameter information to at least one external device 2000 capable of requesting inference using the AI model.

In operation 540, the electronic device 1000 may receive, from the external device 2000, input data encrypted based on the transmitted parameter information.

The external device 2000 according to an embodiment of the disclosure may provide a service to a user according to a result of performing inference using an AI model, based on user data. However, when the external device 2000 does not include an AI model or has a performance insufficient to process the AI model, the external device 2000 may request the electronic device 1000 to perform inference using the AI model. For example, the external device 2000 may request the electronic device 1000 to perform inference based on the user data using the AI model. However, to prevent and/or reduce leakage of the input data of the AI model, which includes the user data, by the electronic device 1000 or during transmission, the external device 2000 may encrypt the input data and then transmit the encrypted input data to the electronic device 1000.

In operation 550, the electronic device 1000 may perform inference using the AI model transformed in operation 510, based on the encrypted input data received from the external device 2000. Data output from the AI model as a result of performing inference may be transmitted to the external device 2000. When the encrypted input data according to an embodiment of the disclosure is homomorphically encrypted data, the data output from the AI model may also be encrypted data. Therefore, because the encrypted output data is transmitted to the external device 2000, leakage of the user data included in the output data of the AI model by the electronic device 1000 or during transmission may be prevented and/or reduced.

Figure 6:
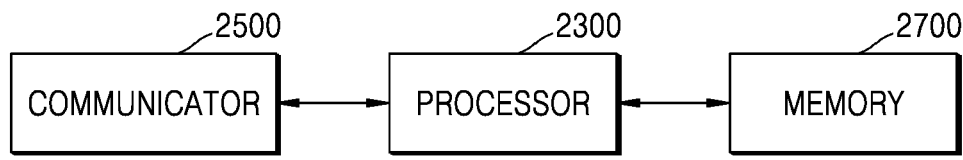
FIG. 6 is a block diagram illustrating an example configuration of an external device according to various embodiments.

FIG. 6 is a block diagram illustrating an example configuration of the external device 2000 according to various embodiments.

Figure 7:
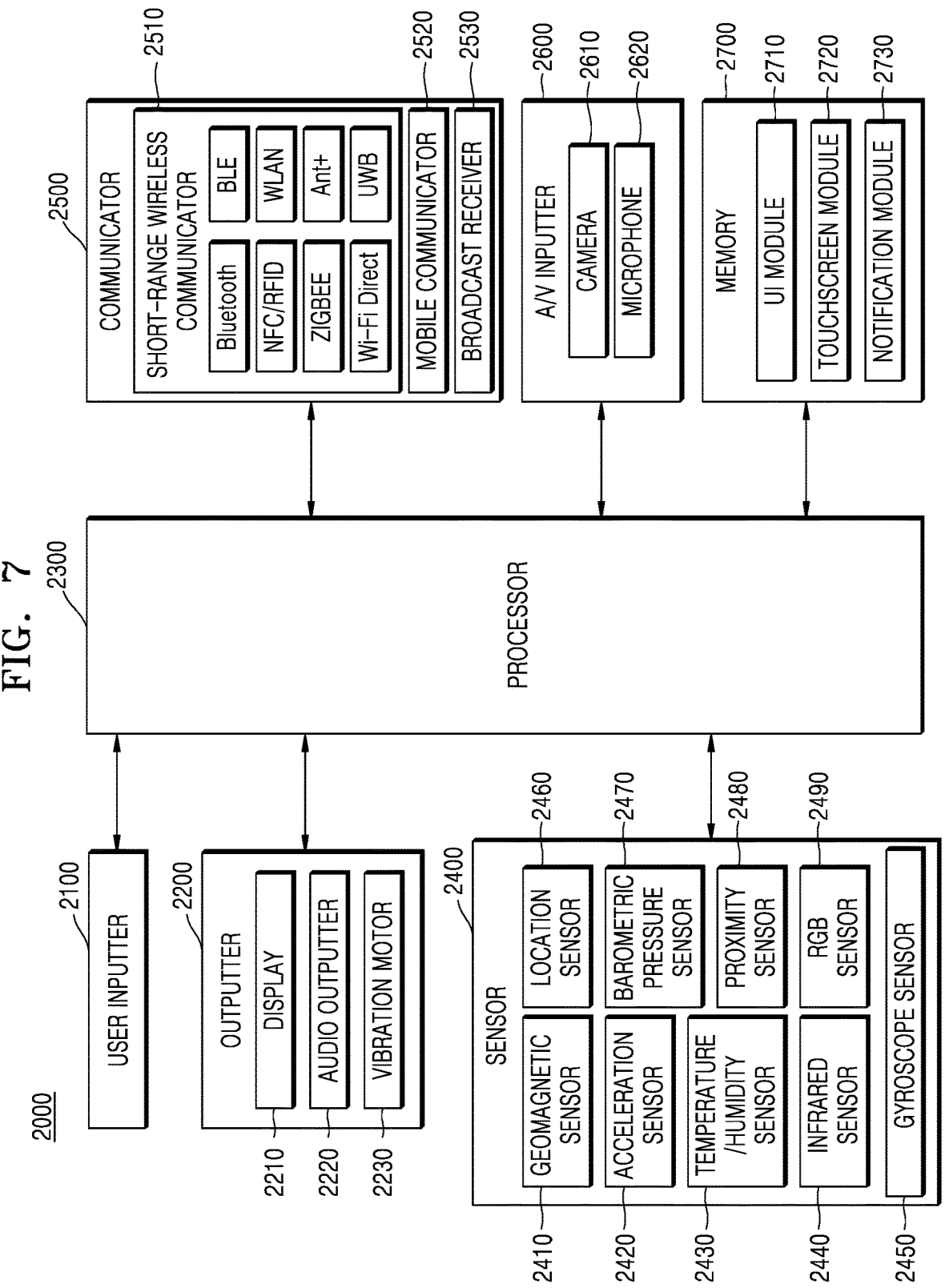
FIG. 7 is a block diagram illustrating an example configuration of an external device according to various embodiments.

FIG. 7 is a block diagram illustrating an example configuration of the external device 2000 according to various embodiments.

Referring to FIG. 6, the external device 2000 may include a processor (e.g., including processing circuitry) 2300, a communicator (e.g., including communication circuitry) 2500, and a memory 2700. However, not all elements illustrated in FIG. 6 are essential elements of the external device 2000. The external device 2000 may be implemented with more elements than the shown elements of FIG. 6 or may be implemented with fewer elements than the shown elements of FIG. 6.

For example, as illustrated in FIG. 7, in addition to the processor 2300, the communicator 2500, and the memory 2700, the external device 2000 according to an embodiment of the disclosure may further include a user inputter (e.g., including input circuitry) 2100, an outputter (e.g., including output circuitry) 2200, a sensor 2400, and an audio/video (A/V) inputter (e.g., including A/V input circuitry) 2600.

The user inputter 2100 may include various circuitry by which a user inputs data for controlling the external device 2000. For example, the user inputter 2100 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto.

According to an embodiment of the disclosure, the user inputter 2100 may receive a user input for performing inference using an AI model. For example, based on the user input through the external device 2000, data for requesting inference using the AI model may be transmitted to the electronic device 1000.

The outputter 2200 may include various output circuitry and output an audio signal, a video signal, or a vibration signal, and include a display 2210, an audio outputter 2220, and a vibration motor 2230.

When the display 2210 and a touchpad are layered to configure a touchscreen, the display 2210 may be used not only as an output device but also as an input device. The display 2210 may include at least one of a liquid crystal display, a thin film transistor-liquid crystal display, an organic light-emitting diode, a flexible display, a three-dimensional (3D) display, or an electrophoretic display. Depending on implementation of the external device 2000, the external device 2000 may include two or more displays 2210.

The audio outputter 2220 may include various audio output circuitry and outputs audio data received from the communicator 2500 or stored in the memory 2700. The vibration motor 2230 may output a vibration signal. When touch is input to a touchscreen, the vibration motor 2230 may also output a vibration signal.

The outputter 2200 according to an embodiment of the disclosure may include various output circuitry and output data about a result of performing inference using the AI model. The external device 2000 according to an embodiment of the disclosure may output data for providing a service to the user, in various forms, e.g., an image, sound, or vibration, based on data output from the AI model and received from the electronic device 1000.

The processor 2300 may include various processing circuitry and generally controls overall operations of the external device 2000. For example, the processor 2300 may execute programs stored in the memory 2700 to control the user inputter 2100, the outputter 2200, the sensor 2400, the communicator 2500, and the A/V inputter 2600.

The external device 2000 may include at least one processor 2300. For example, the external device 2000 may include various types of processors, e.g., a central processing unit (CPU), a graphics processing unit (GPU), a neural processing unit (NPU), or the like, but is not limited thereto.

The processor 2300 may be configured to process commands of a computer program by performing basic arithmetic, logic, and input/output operations. The commands may be provided from the memory 2700 to the processor 2300, or be received through the communicator 2500 and provided to the processor 2300. For example, the processor 2300 may be configured to execute commands based on program code stored in a recording device such as memory.

The processor 2300 according to an embodiment of the disclosure may encrypt input data of the AI model to be transmitted to the electronic device 1000, based on parameter information received from the electronic device 1000. The processor 2300 may generate a private key of the external device 2000 to encrypt the input data, and use the private key to decrypt encrypted output data received from the electronic device 1000.

The processor 2300 may transmit the encrypted input data to the electronic device 1000 together with data for requesting inference using the AI model, and receive, from the electronic device 1000, encrypted output data including a result of performing inference using the AI model. The processor 2300 may decrypt the encrypted output data using the private key, and provide various services to the user based on the decrypted output data.

The sensor 2400 may include various sensors and detect a status of the external device 2000 or an ambient environment of the external device 2000, and transmit the detected data to the processor 2300.

The sensor 2400 may include at least one of a geomagnetic sensor 2410, an acceleration sensor 2420, a temperature/humidity sensor 2430, an infrared sensor 2440, a gyroscope sensor 2450, a location sensor (e.g., a global positioning system (GPS)) 2460, a barometric pressure sensor 2470, a proximity sensor 2480, and/or an RGB (or illuminance) sensor 2490, but is not limited thereto.

The external device 2000 according to an embodiment of the disclosure may obtain input data of the AI model based on the data detected and collected by the sensor 2400, encrypt the input data, and transmit the encrypted input data to the electronic device 1000. Although the data detected and collected by the sensor 2400 may include personal data of the user (e.g., location data or image data of the user), the input data including the detected data according to an embodiment of the disclosure may be encrypted before being provided to the electronic device 1000. Therefore, a probability of leakage of the detected data including personal data of the user may be reduced.

The communicator 2500 may include various communication circuitry included in one or more elements for enabling the external device 2000 to communicate with the electronic device 1000 or other external devices (not shown). For example, the communicator 2500 may include a short-range wireless communicator 2510, a mobile communicator 2520, and a broadcast receiver 2530.

The short-range wireless communicator 2510 may include a Bluetooth communicator, a BLE communicator, a NFC communicator, a WLAN (or Wi-Fi) communicator, a Zigbee communicator, an IrDA communicator (not shown), a Wi-Fi Direct (WFD) communicator, a UWB communicator, or an Ant+ communicator, but is not limited thereto.

The mobile communicator 2520 transmits and/or receives a radio signal to or from at least one of a base station, an external terminal, or a server in a mobile communication network. Herein, the radio signal may include various types of data based on transmission or reception of a voice call signal, a video call signal, or a text/multimedia message.

The broadcast receiver 2530 receives broadcast signals and/or broadcast information through broadcast channels from outside. The broadcast channels may include satellite channels and terrestrial channels. Depending on implementation, the external device 2000 may not include the broadcast receiver 2530.

The communicator 2500 according to an embodiment of the disclosure may receive parameter information from the electronic device 1000. The communicator 2500 may transmit input data encrypted based on the parameter information to the electronic device 1000 together with a request for inference using the AI model. The communicator 2500 may receive an output result of the AI model from the electronic device 1000 in response to the inference request. Because the input data and the output data of the AI model are transmitted in an encrypted state between the electronic device 1000 and the external device 2000 according to an embodiment of the disclosure, a probability of leakage of information included in the input data and the output data during transmission or by the electronic device 1000 may be reduced.

The A/V inputter 2600 may include various A/V input circuitry and is used to input an audio or video signal, and may include a camera 2610 and a microphone 2620. The camera 2610 may obtain a still image or image frames of a video using an image sensor in a video call mode or a camera mode. The image captured by the image sensor may be processed through the processor 2300 or a separate image processor (not shown). The microphone 2620 receives an external audio signal and processes the audio signal into electrical voice data.

The external device 2000 according to an embodiment of the disclosure may obtain input data of the AI model based on the audio or video signal obtained by the A/V inputter 2600, encrypt the input data, and transmit the encrypted input data to the electronic device 1000. Although the data obtained by the A/V inputter 2600 may include personal data of the user (e.g., voice or image data of the user), the input data according to an embodiment of the disclosure may be encrypted before being provided to the electronic device 1000. Therefore, a probability of leakage of the voice or image data including personal data of the user may be reduced.

The memory 2700 may store programs for processing and control operations of the processor 2300, and also store data input to or to be output from the external device 2000.

The memory 2700 according to an embodiment of the disclosure may store one or more instructions, and the above-described at least one processor 2300 of the external device 2000 may execute the one or more instructions stored in the memory 2700 to perform inference using the AI model according to an embodiment of the disclosure.

The memory 2700 may include at least one type of storage medium from among flash memory, a hard disk, a multimedia card micro, a memory card (e.g., a SD or XD memory card), RAM, SRAM, ROM, EEPROM, PROM, magnetic memory, a magnetic disc, and an optical disc.

The programs stored in the memory 2700 may be classified into a plurality of modules, e.g., a user interface (UI) module 2710, a touchscreen module 2720, and a notification module 2730, depending on functions thereof.

The UI module 2710 may provide a specialized UI or graphical user interface (GUI) connected to the external device 2000, for each application. The touchscreen module 2720 may detect a touch gesture of the user on a touchscreen, and transmit information about the touch gesture to the processor 2300. The touchscreen module 2720 according to an embodiment of the disclosure may recognize and analyze touch code. The touchscreen module 2720 may be configured as separate hardware including a controller.

Various sensors may be provided in or near the touchscreen to detect touch or proximity touch on the touchscreen. The sensors for detecting touch on the touchscreen may include, for example, a tactile sensor. The tactile sensor refers to a sensor for detecting contact of a certain object like or better than a human. The tactile sensor may detect various types of data, e.g., roughness of a contact surface, hardness of a contact object, and temperature at a contact point.

The touch gesture of the user may include, for example, tap, touch & hold, double tap, drag, pan, flick, drag & drop, and swipe.

The notification module 2730 may generate a signal to notify that an event of the external device 2000 has occurred.

FIG. 8 is a flowchart illustrating an example method for the external device 2000 to request the electronic device 1000 to perform inference using an AI model, according to various embodiments.

Referring to FIG. 8, in operation 810, the external device 2000 may receive parameter information from the electronic device 1000. In an embodiment of the disclosure, when the parameter information may be reset when an AI model is updated, whenever the parameter information is reset by the electronic device 1000, the external device 2000 may receive the reset parameter information from the electronic device 1000.

The parameter information according to an embodiment of the disclosure may be generated for each AI model. Therefore, the external device 2000 may receive, from the electronic device 1000, one or more pieces of parameter information respectively for one or more AI models.

In operation 820, for various purposes, e.g., in order to perform an operation or provide a service to a user, the external device 2000 may determine an AI model to be requested to perform inference in the electronic device 1000. The external device 2000 according to an embodiment of the disclosure may determine one of the one or more AI models corresponding to the parameter information received in operation 810, as the AI model to be requested to perform inference in the electronic device 1000. In an embodiment of the disclosure, when the AI model may perform inference in the electronic device 1000, the external device 2000 may request the electronic device 1000 to perform inference using the AI model.

In operation 830, the external device 2000 may obtain the parameter information previously received in operation 810, for the AI model determined in operation 820. In an embodiment of the disclosure, the external device 2000 may receive and store the one or more pieces of parameter information respectively set for the one or more AI models by the electronic device 1000. Therefore, the external device 2000 may obtain the parameter information for the AI model to be requested to perform inference, from among the previously stored one or more pieces of parameter information.

In operation 840, the external device 2000 may encrypt input data to be input to the AI model, based on the parameter information obtained in operation 830. In an embodiment of the disclosure, the parameter information may include information about at least one parameter for encrypting the input data to be suitable for the AI model to process the encrypted input data.

The external device 2000 according to an embodiment of the disclosure may generate a private key of the external device 2000 to encrypt the input data based on the parameter information, in order to decrypt output data of the AI model. The external device 2000 may also generate a public key corresponding to the private key.

The private key according to an embodiment of the disclosure may be set to a random real value, and the public key may be set based on the private key. The public key according to an embodiment of the disclosure may be used by the AI model to perform inference in the electronic device 1000, based on the encrypted input data.

In operation 850, the external device 2000 may transmit, to the electronic device 1000, the input data encrypted in operation 840, and request the electronic device 1000 to perform inference using the AI model. In an embodiment of the disclosure, the external device 2000 may transmit the encrypted input data to the electronic device 1000 together with the public key generated to encrypt the input data in operation 840.

The external device 2000 may obtain encrypted output data of the AI model from the electronic device 1000 in operation 860, and decrypt the encrypted output data in operation 870.

The encrypted output data according to an embodiment of the disclosure may be decrypted using the private key of the external device 2000. The external device 2000 according to an embodiment of the disclosure may perform an operation or provide various services to the user, based on the decrypted output data.

According to an embodiment of the disclosure, by transforming an AI model to be suitable for processing encrypted input data, inference using the AI model may be performed based on the encrypted input data, or an amount of computation for inference may be reduced.

A machine-readable storage medium may be provided in the form of a non-transitory storage medium. When the storage medium is 'non-transitory', the storage medium is tangible and may not include signals (e.g., electromagnetic waves), and it does not limit that data is semi-permanently or temporarily stored in the storage medium. For example, the 'non-transitory storage medium' may include a buffer for temporarily storing data.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be electronically distributed (e.g., downloaded or uploaded) via an application store (e.g., Play Store™) or directly between two user devices (e.g., smartphones). For electronic distribution, at least a part of the computer program product (e.g., a downloadable app) may be temporarily generated or be at least temporarily stored in a machine-readable storage medium, e.g., a memory of a server of a manufacturer, a server of an application store, or a relay server.

As used herein, the term "unit" may indicate a hardware component such as a processor or a circuit, and/or a software component executed by the hardware component such as the processor.

The above descriptions of the disclosure are provided for the purpose of illustration, and it will be understood by one of ordinary skill in the art that various changes in form and details may be made therein without departing from the scope of the disclosure. Therefore, it should be understood that the afore-described embodiments of the disclosure should be considered in a descriptive sense only and not for purposes of limitation. For example, each component described to be of a single type can be implemented in a distributed manner and, likewise, components described as being distributed can be implemented in a combined manner.

The scope of the disclosure includes the following claims, and it should be understood that all modifications from the claims and their equivalents are included in the scope of the disclosure.

What is claimed is:

1. A method for performing, by an electronic device, inference based on encrypted data received from an external device, using an artificial intelligence (AI) model, the method comprising:
    transforming the AI model such that an output outputted from the AI model when an input is inputted to the AI model is approximated to decrypted data of an encrypted output outputted from the transformed AI model when an encrypted input corresponding to the input is inputted to the transformed AI model;
    generating parameter information on method for encrypting input data, based on the transformed AI model;
    transmitting the parameter information to the external device;
    receiving, from the external device, the encrypted input data encrypted based on the parameter information, and a public key generated by the external device;
    obtaining an inference result output from the transformed AI model by inputting the encrypted input data and the public key to the transformed AI model; and
    transmitting the inference result to the external device, wherein the inference result is decrypted based on a private key corresponding to the public key.

2. The method of claim 1, wherein the transforming comprises transforming a function incapable of processing the encrypted input data from among functions included in the AI model, to another function capable of processing the encrypted input data.

3. The method of claim 2, wherein a non-polynomial function from among the functions included in the AI model is transformed to a polynomial function approximated to the non-polynomial function.

4. The method of claim 1, wherein the transforming comprises transforming at least one of operations included in the AI model, to another operation requiring a lower amount of computation to process the encrypted input data.

5. The method of claim 4, wherein a plurality of multiplications included in the AI model are transformed to a combination of additions and rotations.

6. The method of claim 1, wherein the transforming comprises transforming a structure of data input to or output from each layer of the AI model, to reduce an amount of computation required for the AI model to process the encrypted input data.

7. The method of claim 1, wherein the parameter information is generated based on a type and a number of operations performed by the AI model on the encrypted input data.

8. An electronic device configured to perform inference based on encrypted data received from an external device, using an artificial intelligence (AI) model, the electronic device comprising:
a communicator comprising communication circuitry configured to transmit and/or receive data to and/or from the external device;
a memory storing one or more instructions; and
at least one processor configured to execute the one or more instructions stored in the memory to configure the processor to:
transform the AI model such that an output outputted from the AI model when an input is inputted to the AI model is approximated to decrypted data of an encrypted output outputted from the transformed AI model when an encrypted input corresponding to the input is inputted to the transformed AI model;
generate parameter information on method for encrypting input data, based on the transformed AI model;
control the communicator to transmit the parameter information to the external device;
control the communicator to receive, from the external device, the encrypted input data encrypted based on the parameter information and a public key generated by the external device;
obtain an inference result output from the transformed AI model by inputting the encrypted input data to the transformed AI model; and
transmit the inference result to the external device, wherein the inference result is decrypted based on a private key corresponding to the public key.

9. The electronic device of claim 8, wherein the at least one processor is further configured to transform a function incapable of processing the encrypted input data from among functions included in the AI model, to another function capable of processing the encrypted input data.

10. The electronic device of claim 9, wherein a non-polynomial function from among the functions included in the AI model is transformed to a polynomial function approximated to the non-polynomial function.

11. The electronic device of claim 8, wherein the at least one processor is further configured to transform at least one of operations included in the AI model, to another operation requiring a lower amount of computation to process the encrypted input data.

12. The electronic device of claim 11, wherein a plurality of multiplications included in the AI model are transformed to a combination of additions and rotations.

13. The electronic device of claim 8, wherein the at least one processor is further configured to transform a structure of data input to or output from each layer of the AI model, to reduce an amount of computation required for the AI model to process the encrypted input data.

14. The electronic device of claim 8, wherein the parameter information is generated based on a type and a number of operations performed by the AI model on the encrypted input data.

15. A non-transitory computer-readable recording medium having recorded thereon a computer program which, when executed by a processor, causes the operations of claim 1 to be performed on a computer.

* * * * *